Oct. 23, 1945.  G. E. GUELLICH ET AL  2,387,440
COORDINATE MEASURING STAGE
Filed March 19, 1943   5 Sheets-Sheet 5
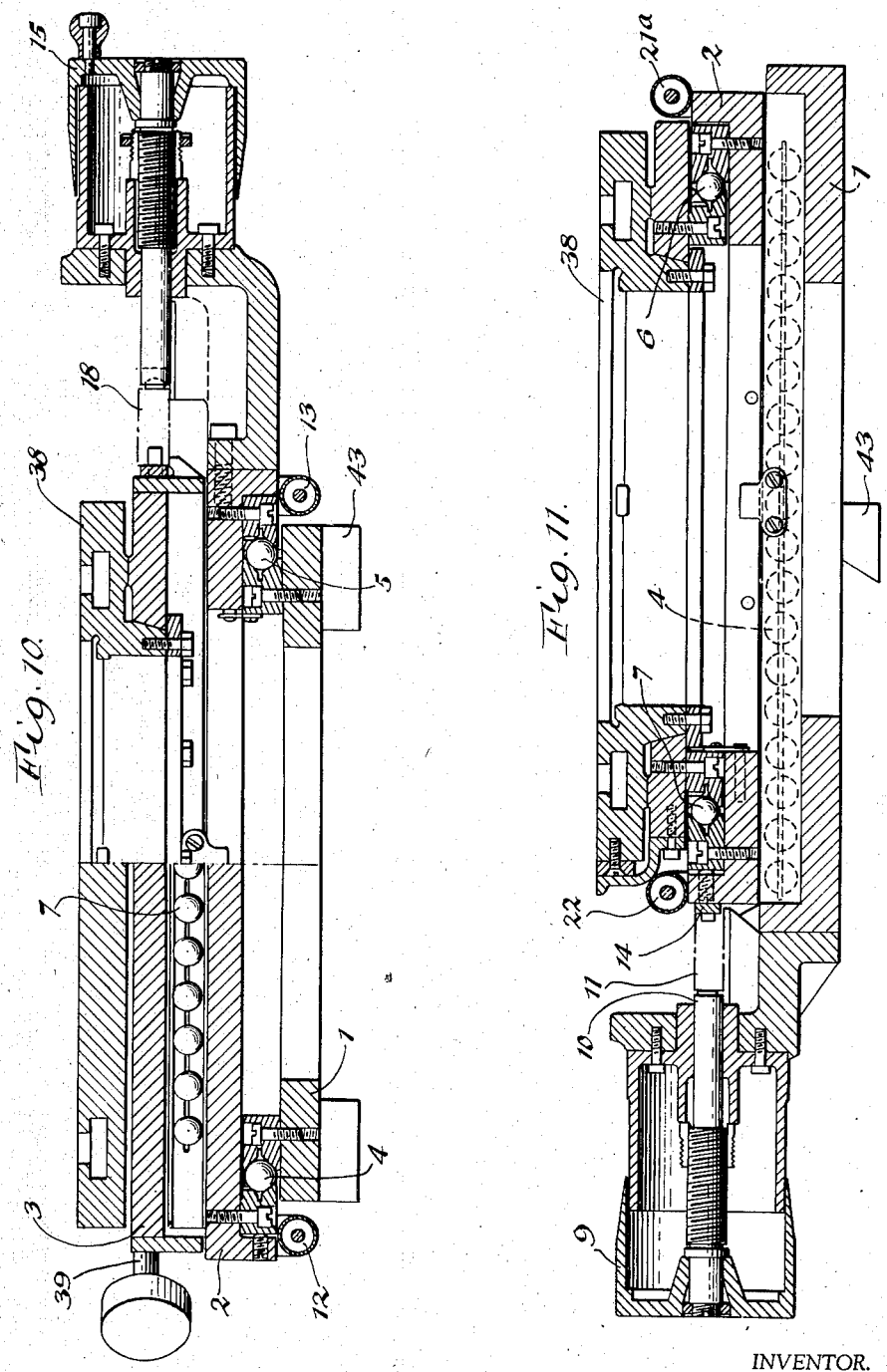
INVENTOR.
GUSTAV E. GUELLICH
ALBIN A. GRADISAR
BY
ATTORNEY Patented Oct. 23, 1945

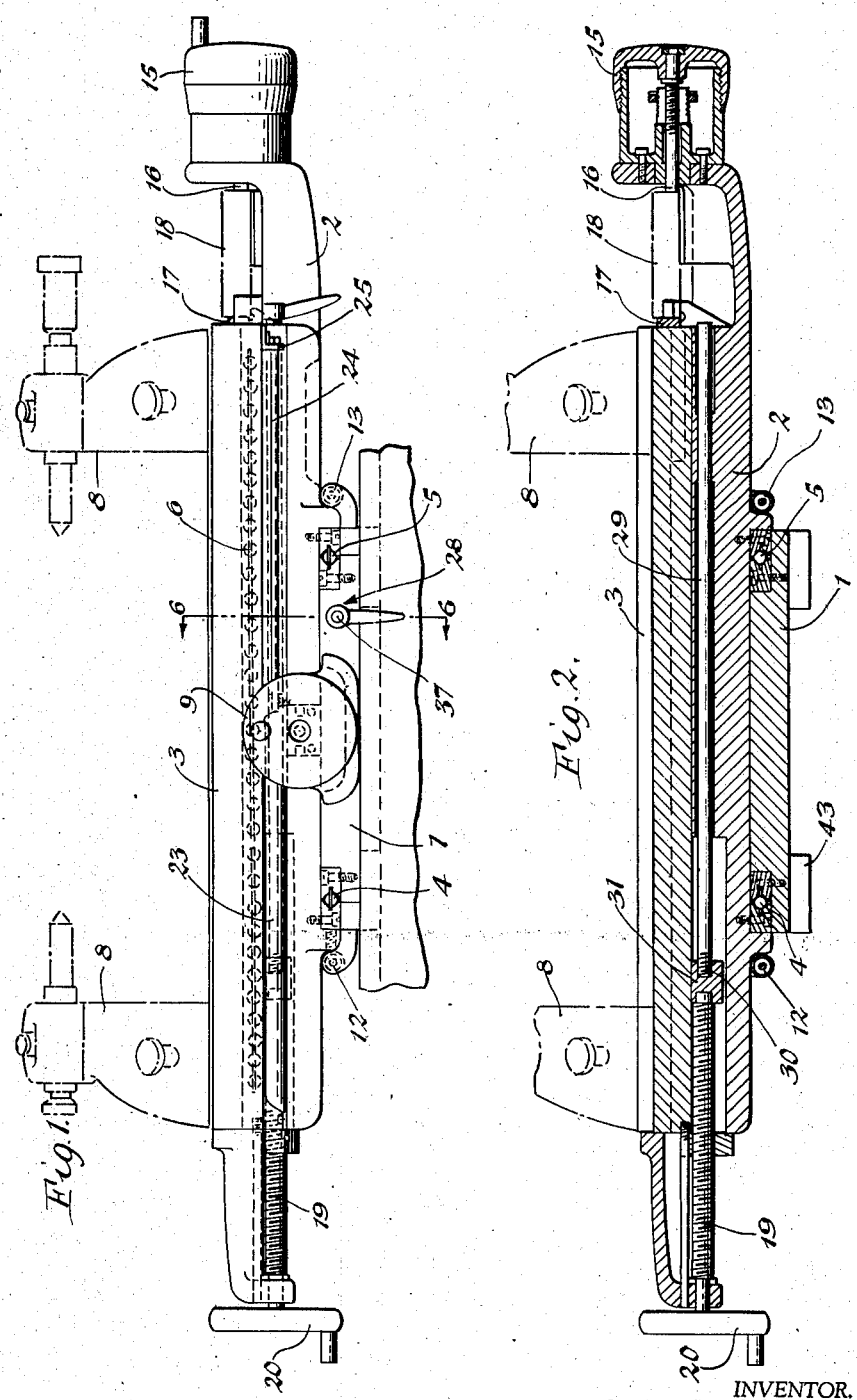

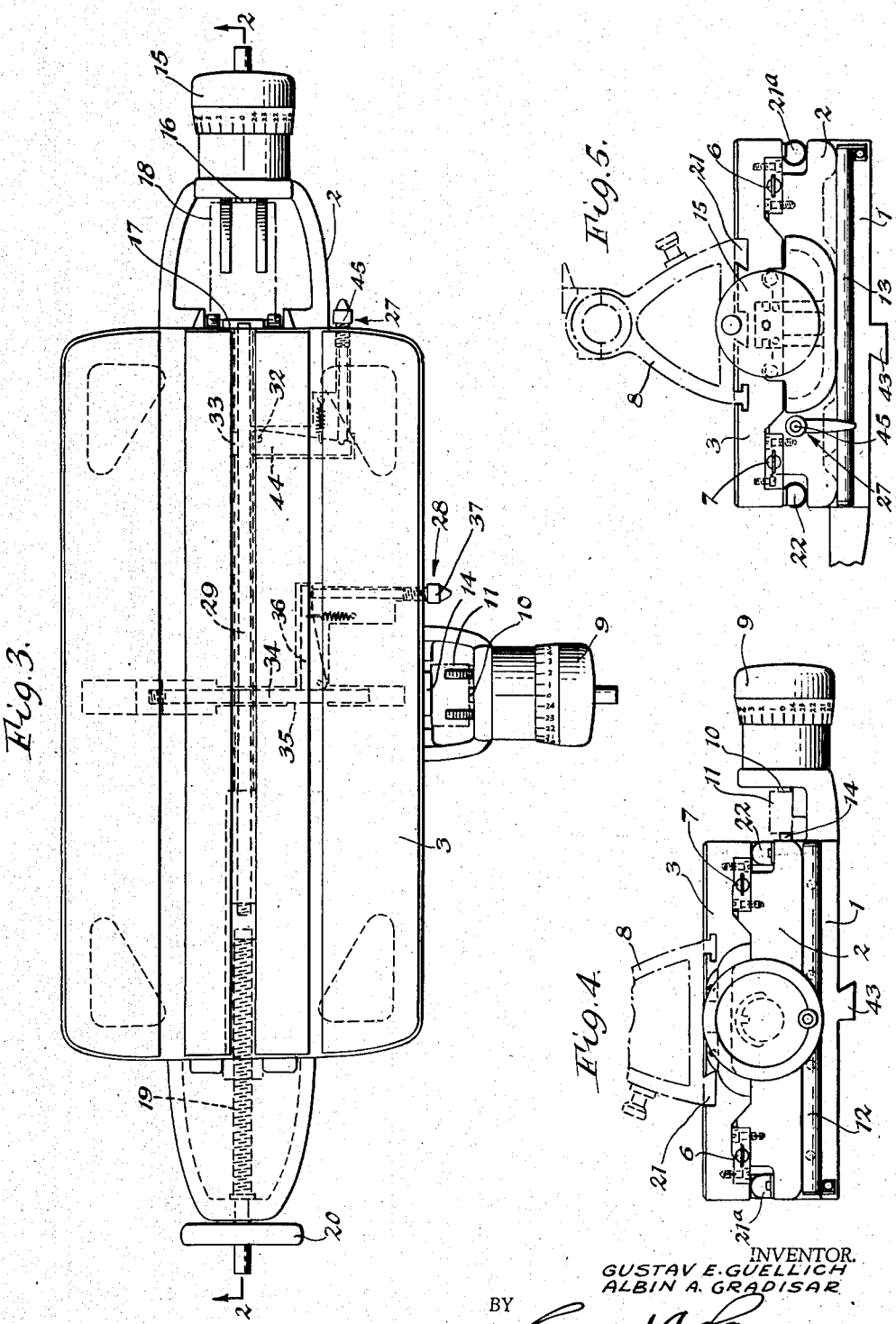

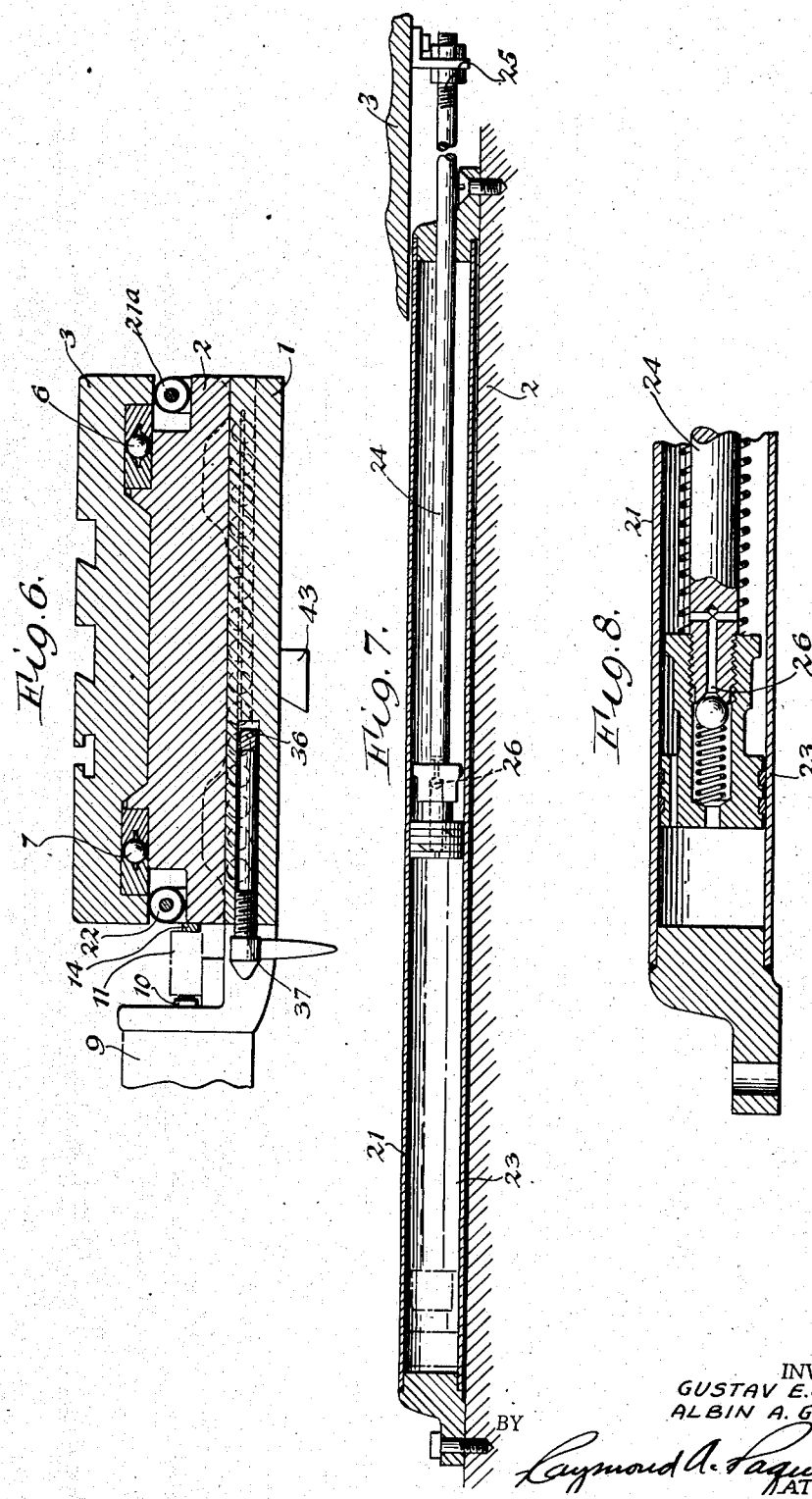

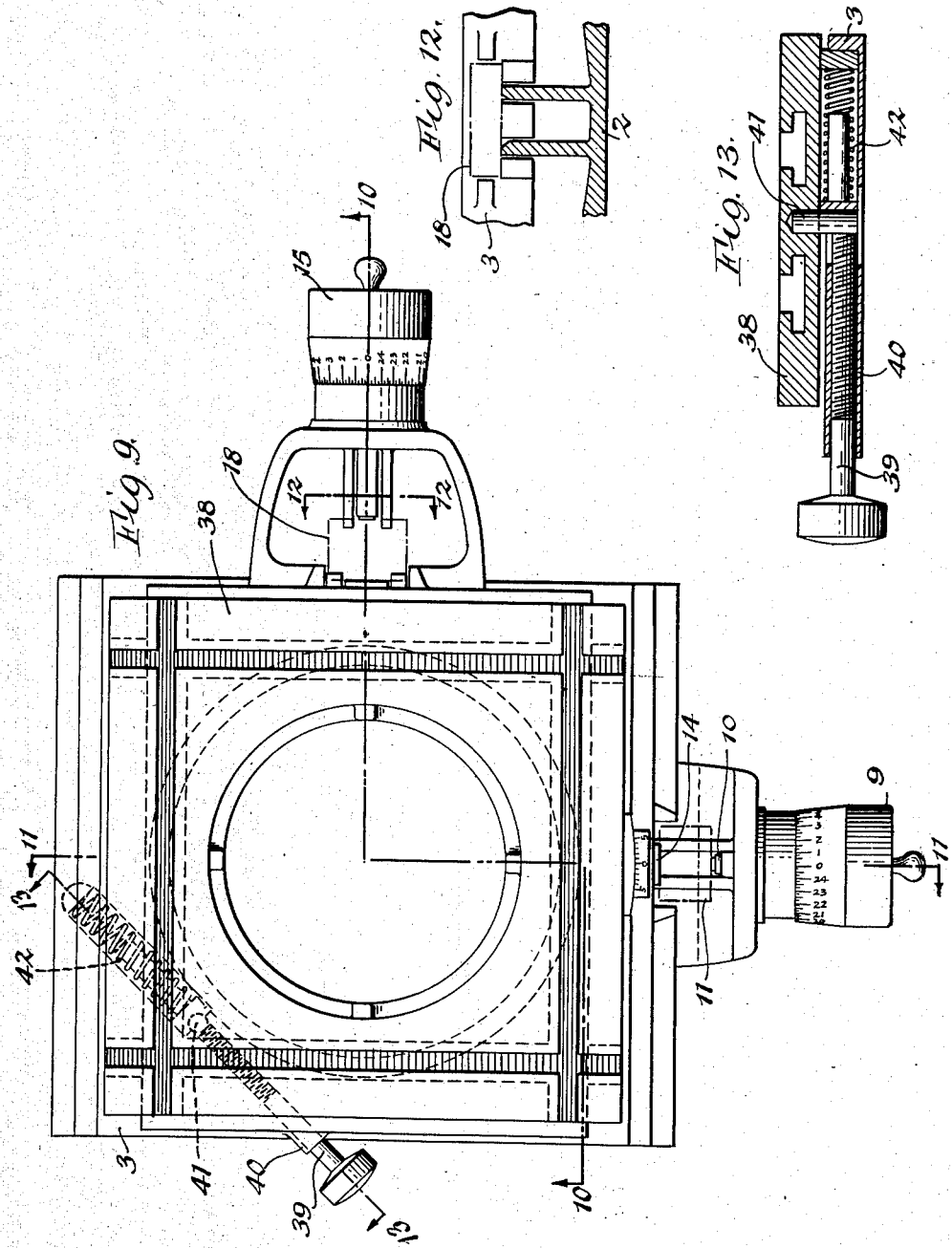

2,387,440

UNITED STATES PATENT OFFICE 2,387,440

COORDINATE MEASURING STAGE

Gustav E. Guellich and Albin A. Gradisar, Buffalo, N. Y., assignors, by mesne assignments, to American Optical Company, Southbridge, Mass., a voluntary association Application March 19, 1943, Serial No. 479,758

6 Claims. (Cl. 33—174)

This invention relates to coordinate measuring stages and more particularly to such devices adapted for use with contour projectors or measuring microscopes and other measuring and inspection devices.

An object of the present invention is to provide a new and improved device of the type set forth which may be attached to or removed from a measuring device as a separate complete unit.

Another object of the invention is to provide a new and improved device of the type set forth which has improved means for locking the movable parts thereof in adjusted position.

Another object of the invention is to provide a new and improved device of the type set forth wherein the measuring means is effectively and actually in line with the dimension being measured and which thereby eliminates errors due to side play or misalignment of ways.

Another object of the invention is to provide a new and improved device of the type set forth which is of rugged and durable construction and has means for damping the return motion of the movable portion thereof.

Another object of the invention is to provide such a device with improved means for pivoting or rotating the movable portion thereof which means eliminates strain and prevents wear of the movable parts.

Other objects and advantages of the invention will be apparent from the following description taken in connection with the accompanying drawings. We therefore do not wish to be limited to the exact details of construction and arrangement of parts shown and described as the preferred forms have been shown by way of illustration only.

Referring to the drawings:

Fig. 1 is a side view of a measuring device embodying the invention.

Fig. 2 is a sectional view taken on line 2—2 of Fig. 3 looking in the direction of the arrows.

Fig. 3 is a top or plan view of the measuring device shown in Figs. 1 and 2.

Fig. 4 is an end view of the device shown in Figs. 1 to 3 inclusive.

Fig. 5 is also an end view of the device shown in Fig. 4 but from the opposite end thereof.

Fig. 6 is a fragmentary view taken on line 6—6 of Fig. 1 looking in the direction of the arrows;

Fig. 7 is a sectional view of the damping apparatus;

Fig. 8 is an enlarged fragmentary view of a portion of the damping mechanism shown in Fig. 7;

Fig. 9 is a top or plan view of another form of the device;

Fig. 10 is a sectional view taken on line 10—10 of Fig. 9 looking in the direction of the arrows;

Fig. 11 is a sectional view taken on line 11—11 of Fig. 9 looking in the direction of the arrows;

Fig. 12 is a sectional view taken on line 12—12 of Fig. 9; and

Fig. 13 is a sectional view taken on line 13—13 of Fig. 9 looking in the direction of the arrows.

Referring more particularly to the drawings wherein similar reference characters designate corresponding parts throughout the several views the device embodying the invention comprises a coordinate measuring stage adapted for use in connection with contour projectors, toolmakers' microscopes and other measuring devices.

The device comprises a base plate 1 on which is slidably mounted the intermediate plate 2 and on said intermediate plate 2 is adjustably mounted the top plate 3.

Between the base 1 and intermediate plate 2 are provided the ball race members 4 and 5 and between the intermediate plate 2 and the top plate 3 are provided the ball races 6 and 7.

On the top plate 3 is adapted to be placed desired means for supporting the article to be measured. One form of such means is shown in Figs. 1 and 5. The holding means shown is adapted to engage the opposite ends of the member to support the same in desired position. The forms shown of such holding device 8 is merely for the purpose of illustration and it will be understood that such holding devices may be of other desired form depending upon the particular devices to be supported.

To adjust the intermediate plate 2 on the base member 1 and also to measure the amount of such adjustment the micrometer member 9 is provided. The micrometer member 9 has a spindle 10 adapted to engage the anvil face of the intermediate member 2 or if a gauge block is employed or inserted between said anvil face of the intermediate member 2 and the spindle 10 then said spindle will engage said gauge block and by the rotation of said micrometer member 9 said intermediate member 2 will be adjusted in a direction away from said micrometer member 9 on the ball races 4 and 5.

To retain the anvil face of the intermediate member 2 in engagement with the gauge block 11 or with the spindle 10 as the case may be, that is to urge the intermediate member in a direction toward the micrometer member 9 and against the action of the spindle 10 there are provided a pair of damping or snubber members 12 and 13. The snubber members also serve as damping means for limiting the action of the intermediate member 2 on removal of the gauge block 11 from its position between the spindle 10 and anvil face 14 on the member 2.

The top plate or table member 3 is slideably mounted on the intermediate member 2 but in a direction at right angles to the direction of movement of the intermediate member 2 and is adapted to be moved in sliding relation with the intermediate member 2 by means of the micrometer member 15 having the spindle 16 which engages the anvil face 17 on the top plate 3 or the gauge block 18 adapted to be inserted between the anvil face 17 and spindle 16 in the same manner as previously described.

For rapid displacement of the top plate 3 on the intermediate plate 2 there is provided the screw 19 adapted to be adjusted by the hand wheel 20.

In the upper surface of the top plate 3 are provided the longitudinal ways 21 adapted to receive the retaining means from the holding members 8 to allow said holding members 8 to be adjusted on said top plate 3 to urge the top plate 3 against the action of the micrometer member 15 and also to serve as a damping member when the gauge block 18 is removed there is provided a pair of snubber members 21a and 22 between the top plate 3 and the intermediate plate 2.

These snubbers 12 and 13 and 21a and 22 may be of similar construction as shown in Figs. 7 and 8 and comprise a spindle member 23 which is secured adjacent to ends to one of the plate members and the piston rod 24 which is slidably mounted within the cylinder member and which is secured at its free end 25 to the other of said table members. The piston member 24 is provided adjacent the end thereof with an escape valve arrangement 26 and this valve may be of various forms as described.

While the snubber arrangement shown is air operated or controlled it will be apparent that such snubber may be of fluid or other known types.

To retain the upper table member 3 in adjusted position there are provided the locking members 27 and to retain the intermediate carriage in adjusted position there is provided a similar locked arrangement 28.

The locking arrangement 27 that is the arrangement for locking the top or table member 3 in adjusted position comprises the rod member 29 extending between said table member 3 and the intermediate member 2. This rod is secured adjacent its end 30 to a block or the like 31 which is connected directly to the top plate member 3 and adapted to move therewith. The rod member 29 also therefore moves upon movement of the top plate member 3. It is pointed out that this rod member is arranged on the axis of the screw 19, and therefore the locking of said rod in adjusted position will automatically lock said top plate member 3 in said adjusted position without causing any strain or misalignment of the plates.

Pivotally mounted adjacent said rod is the locking lever 44 adapted to be actuated by the screw 45 whereby upon pivoting of said locking lever upon its pivot 32 said locking lever may be caused to wedge against said rod 29 to cause said rod 29 to engage against the raised portion bearing surface 33 of the intermediate plate 2 to lock said member 3 in adjusted position.

A similar alignment is shown for locking the intermediate member 2 in adjusted position on the base 1. In this case the rod member 34 is adapted to be wedged against the raised bearing surface 35 by means of the pivoted lock lever 36 which is adapted to be actuated by the screw 37.

The form of the invention shown in Figs. 9 to 13 inclusive is practically the same as the forms shown in Figs. 1 to 8 inclusive except that the spindle member 19 and wheel 20 are omitted and also that the form shown in Fig. 9 has a further table or support 38 over the table 3 and means is provided for pivoting this table member 38 on the table 3. This means for pivoting the table member 38 comprises a tangent screw 39 which is in threaded engagement with the portion 40 secured to the table 3 and is adapted to engage the pin 41 which is secured to the top table 38 and therefore upon engagement of said screw 39 with said pin 41 the top table 38 may be caused to pivot within a certain range. There is also provided the spring or resilient member 42 adapted to engage the opposite side of said pin 41 to counteract the action of said screw 39 and also to return said table 38 to its normal position upon release of the screw 39, however the spring member 42 is provided essentially to retain the pin 41 in constant engagement with the end of the screw 39.

It is pointed out that because of its construction the form of the present invention shown and described may be removed from or attached to an instrument as a separate unit, that is as a separate complete unit adapted for use with either of the types of measuring devices set forth and the slide member 43 permits the quick and easy connection or detachment of the complete measuring device as a separate unit to or from a measuring device with which the unit is to be employed.

In use the measuring device or stage is first secured in proper position with the contour projector or other measuring devices with which it is to be used and the proper fixture 8 for retaining the member to be measured is provided on the upper table 3 or 38. The member is then positioned on the holding member 8.

The micrometer members 9 or the micrometer member 15 may then be adjusted and if necessary gauge blocks may be inserted as previously described.

Then by adjustment of the micrometer members 9 or 15, or both, the measuring device is adjusted and the measurement may be taken from the micrometers or in the case of the contour projector the measurements may be taken directly on the screen.

From the foregoing it will be seen that we have provided simple, efficient and economical means for obtaining all of the objects and advantages of the invention.

Having described our invention, we claim:

1. In a device of the character described, a base member, an intermediate member slidably mounted on said base member, a pair of self-contained air controlled snubber members connected with said base member and said intermediate member and adapted to urge said intermediate member toward its normal position and also prevent too rapid return of the intermediate member, a table member on said intermediate member and a pair of self contained air controlled snubber members connected with said intermediate member and said table member and adapted to urge said table member toward its normal position and also prevent too rapid return of said table member and means for locking said intermediate member in adjusted position.

2. In a device of the character described, a base member, an intermedate member slidably mounted on said base member, a pair of snubber members connected with said base member and said intermediate member and adapted to urge said intermediate member toward its normal position and also prevent too rapid return of the intermediate member, a table member on said intermediate member and a pair of snubber members connected with said intermediate member and said table member and adapted to urge said table member toward its normal position and also prevent too rapid return of said table member, said table member having a projecting portion, resilient means engaging said projecting portion and a tangent screw engaging said projecting portion on said table member for causing pivotal movement of said table member against the action of said resilient means.

3. In a device of the character described, a base member, an intermediate member slidably mounted on said base member, a pair of snubber members connected with said base member and said intermediate member and adapted to urge said intermediate member toward its normal position and also prevent too rapid return of the intermediate member, a table member on said intermediate member and a pair of snubber members connected with said intermediate member and said table member and adapted to urge said table member toward its normal position and also prevent too rapid return of said table member and means for locking said intermediate member in adjusted position said locking means comprising a rod, a pivoted lever adapted to engage said rod and means for actuating said pivoted lever to cause said lever to engage said rod and lock said rod against movement.

4. In a device of the character described, a base member, an intermediate member slidably mounted on said base member, a pair of snubber members connected with said base member and said intermediate member and adapted to urge said intermediate member toward its normal position and also prevent too rapid return of the intermediate member, a table member on said intermediate member and a pair of snubber members connected with said intermediate member and said table member and adapted to urge said table member toward its normal position and also prevent too rapid return of said table member and means for locking said table member in adjusted position, said locking means comprising a rod, a pivoted lever adapted to engage said rod and means for actuating said pivoted lever to cause said lever to engage said rod and lock said rod against movement.

5. In a device of the character described, a base member, an intermediate member slidably mounted on said base member, a pair of snubber members connected with said base member and said intermediate member and adapted to urge said intermediate member toward its normal position and also prevent too rapid return of the intermediate member, a table member on said intermediate member and a pair of snubber members connected with said intermediate member and said table member and adapted to urge said table member toward its normal position and also prevent too rapid return of said table member and means for locking said intermediate member and said table member in adjusted position said locking means comprising a rod, a pivoted lever adapted to engage said rod and means for actuating said pivoted lever to cause said lever to engage said rod and lock said rod against movement.

6. In a device of the character described, a base member, an intermediate member slidably mounted on said base member, a pair of air controlled snubber members connected with said base member and said intermediate member and adapted to urge said intermediate member toward its normal position and also prevent too rapid return of the intermediate member, a table member on said intermediate member and a pair of air controlled snubber members connected with said intermediate member and said table member and adapted to urge said table member toward its normal position and also prevent too rapid return of said table member, said snubber members each being a self contained unit and comprising a cylinder member containing a longitudinally adjustable piston member and an automatically operated escape valve.

GUSTAV E. GUELLICH
ALBIN A. GRADISAR.